United States Patent

Neuroth et al.

(10) Patent No.: US 7,964,046 B2
(45) Date of Patent: Jun. 21, 2011

(54) APPARATUS AND METHOD FOR VIBRATION WELDING

(75) Inventors: Christian Neuroth, Essen (DE); Heiko Priem, Brachtal (DE)

(73) Assignee: Branson Ultraschall Niederlassung der Emerson Technologies GmbH & Co. OHG (DE)

( * ) Notice: Subject to any disclaimer, the term of this patent is extended or adjusted under 35 U.S.C. 154(b) by 983 days.

(21) Appl. No.: 11/544,886

(22) Filed: Oct. 5, 2006

(65) Prior Publication Data

US 2007/0029366 A1    Feb. 8, 2007

(30) Foreign Application Priority Data

Oct. 5, 2005   (DE) .......................... 10 2005 047 706

(51) Int. Cl.
*B32B 37/00*   (2006.01)
(52) U.S. Cl. .......... 156/64; 156/73.5; 156/350; 156/580
(58) Field of Classification Search .................... 156/64, 156/73.1, 73.5, 73.6, 350, 351, 378, 580, 156/580.1, 580.2; 700/299, 301
See application file for complete search history.

(56) References Cited

U.S. PATENT DOCUMENTS

| | | | | |
|---|---|---|---|---|
| 5,772,814 A | * | 6/1998 | Grewell | .................... 156/64 |
| 2005/0061848 A1 | | 3/2005 | Johansen | |

FOREIGN PATENT DOCUMENTS

| | | |
|---|---|---|
| DE | 22 53 528 A | 11/1972 |
| DE | 42 33 929 A1 | 10/1992 |
| DE | 102 52 948 A1 | 11/2002 |
| EP | 1 216 760 A2 | 6/2002 |

* cited by examiner

*Primary Examiner* — James Sells
(74) *Attorney, Agent, or Firm* — Seyfarth Shaw LLP

(57) ABSTRACT

The present invention relates to a method for vibration welding. The vibration welding is performed with a plurality of mechanically decoupled oscillating heads, each of which is connected with a frequency converter. An electrical circuit connects the frequency converters such that one of the frequency converters can be operated as the master and the other frequency converters as slaves. With the help of the controlling effect of the master, both a synchronous and a targeted asynchronous operation of the plurality of oscillating heads can be realized.

10 Claims, 2 Drawing Sheets

⋮

APPARATUS AND METHOD FOR VIBRATION WELDING

1. FIELD OF THE INVENTION

Figure 1:
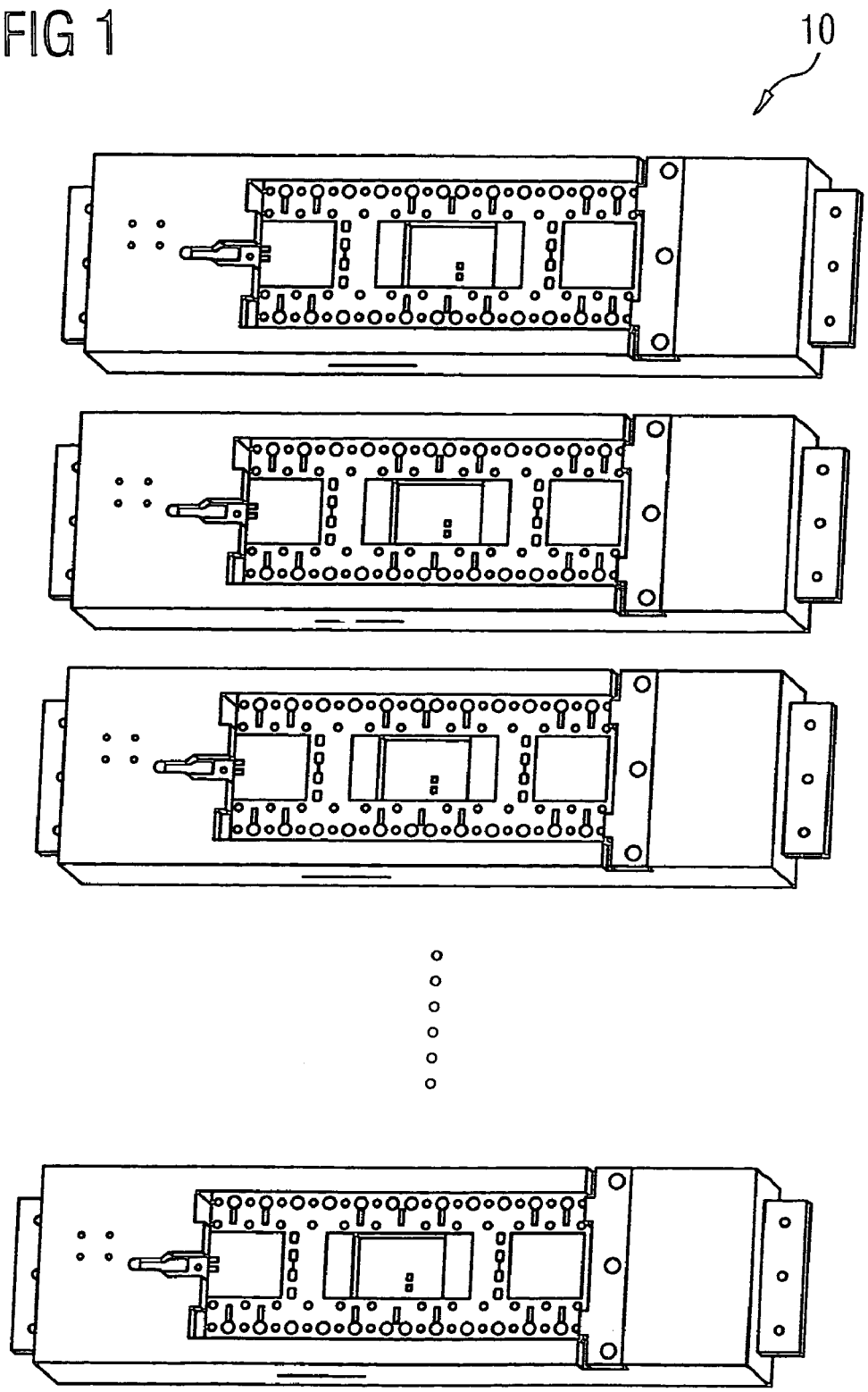

The present invention relates to an apparatus and a method for vibration welding, in particular the vibration welding with a plurality of oscillating heads.

2. BACKGROUND OF THE INVENTION

Vibration welding has established itself for the welding of plastic parts. In this procedure, the plastic parts to be welded are rubbed against each other at certain contact surfaces. Through this friction, the melting temperature of the plastic of the parts to be connected is reached in the joint zone so that the plastic is plasticized and connected at the contact surfaces.

For vibration welding, individual oscillating heads are generally operated in vibration welding machines. This technology is suitable for welding different sizes of plastic parts, such as vehicle dashboards. Different sized machines are used depending on the size of the plastic parts. They are differentiated based on tool weights, surfaces to be welded and installation size.

In order to be able to connect larger plastic parts, it is economical and makes more sense technically to increase the number of oscillating heads in the vibration welding machines rather than continue to increase the size of the individual oscillating heads. Thus, larger constructions are feasible through the series connection of the electrical components, such as electrical coils, and the mechanical coupling of the mechanical components. The mechanical coupling is of central importance in particular for the larger constructions, since only in this manner can a frequency- and phase-equal oscillation of the connected mechanical components and oscillating heads be achieved. However, it is an important disadvantage that, up to now, for construction reasons, only two oscillating heads have been able to be connected with each other and thereby synchronized. However, if a plurality of oscillating heads is required for the vibration welding of large plastic parts, modulation difficulties of the oscillating heads amongst themselves result. For example, an unreliable connection of the plastic parts is created through an uncontrolled, non-in-phase oscillation of the oscillating heads within the vibration welding machine.

It is thus the object of the present invention to provide an apparatus and a method for vibration welding, with which a reliable connection of the plastic parts can be ensured even when using a plurality of oscillating heads or oscillating systems, because the sum of the oscillating systems or oscillating heads works just like a large oscillating head.

3. SUMMARY OF THE INVENTION

The above object is solved through an apparatus in accordance with independent patent claim 1 and through a method in accordance with independent patent claim 6. Advantageous designs, embodiments and further developments of the present invention arise from the following description, the drawings and the associated claims. The present invention provides an apparatus and a method, with which several independent and mechanical uncoupled oscillating systems work in the same amplitude, frequency and phase, so that the effect is the same as that of one single large oscillating head.

The apparatus for vibration welding in accordance with the invention comprises a plurality of mechanically decoupled oscillating heads, each of which are connected with one frequency converter or another suitable drive, an electrical switch, which connects the frequency converter of the oscillating heads such that one of the frequency converters can be operated as master and the other frequency converters as slave, so that based on a controlling effect of the master, a synchronous or a targeted asynchronous operation of the plurality of oscillating heads is feasible.

With the help of the apparatus in accordance with the invention, both the modulation and the constructive difficulties for the synchronous operation of a plurality of oscillating heads are overcome. This is based on the fact that mechanical coupling for synchronization can be forgone with the help of an electrical drive of the plurality of oscillating heads. Furthermore, the electrical supply of these oscillating heads with the same control signal is realized through the electrical interconnection of the mechanically decoupled oscillating heads. The same electrical control signal for each of the oscillating heads ensures that the synchronous operation of the oscillating heads in frequency, phase and amplitude or in a selection of theses variables is possible. In accordance with a further embodiment, it is also conceivable that the constructive and/or material features of plastic parts to be combined make necessary the targeted asynchronous operation of the oscillating heads in relation to phase and/or amplitude. It is also advantageous that the oscillating heads are started and stopped jointly. In accordance with another embodiment, the oscillating heads can also be stopped individually and/or in groups at any time after the joint start.

In accordance with another embodiment, it is preferred that the same frequency and phasing is specified for the plurality of oscillating heads by the master, while the frequency results from the mean value of the resonance frequencies of the individual oscillating heads. As another design, it is also conceivable to drive the slaves by the master via a BUS system or a parallel circuit, with each of which one individual amplitude control of the individual oscillating heads is possible. Based on the individual drive of the oscillating heads and their lack of mechanical coupling, these oscillating heads, e.g. at least two oscillating heads, can be freely positioned with respect to a work piece to be welded. Based on this constructive freedom, it is possible to go into the different work piece geometries, while simultaneously guaranteeing a reliable weld connection.

The method in accordance with the invention for vibration welding with a plurality of oscillating heads, each of which are connected with a frequency converter or another suitable drive and mechanically decoupled from each other, comprises the following steps: defining at least one of the frequency converters as master and the remaining frequency converters as slaves, the driving of the slaves by the at least one master such that the oscillating heads are operated synchronously or targeted asynchronously in frequency, phase and amplitude or in a selection of these variables.

4. BRIEF DESCRIPTION OF THE DRAWINGS

The present invention is explained in greater detail in reference to the accompanying drawing.

Figure 2:
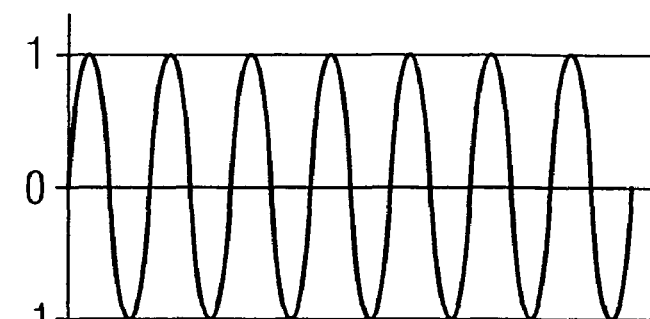
Figure 2:
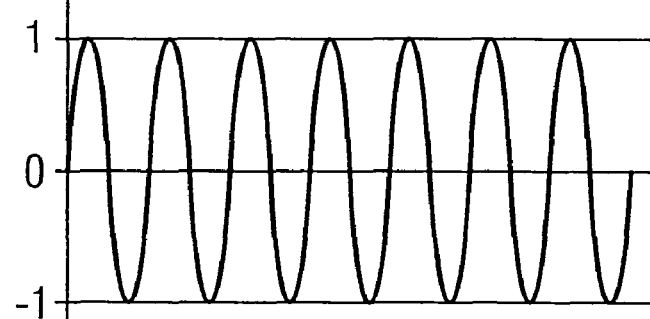
Figure 2:
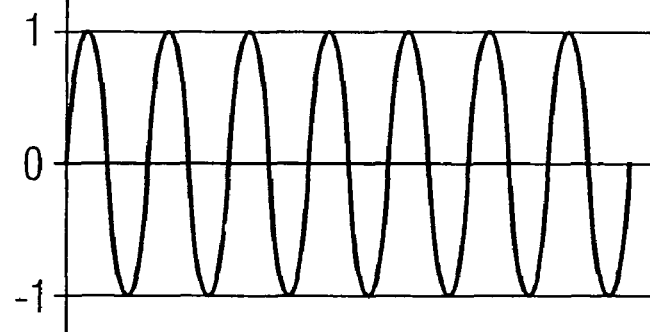
Figure 2:
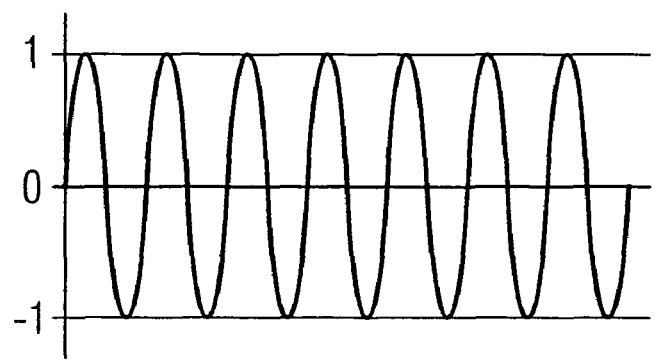

FIG. 1 shows a plurality of oscillating heads, which are operated mechanically decoupled from each other in a vibration welding device and FIG. 2 shows a comparison of the amplitude signals of several oscillating heads.

5. DETAILED DESCRIPTION OF THE PREFERRED EMBODIMENTS

The apparatus for vibration welding comprises a plurality of oscillating heads 10, preferably two or more. FIG. 1 shows an example of these oscillating heads 10. They are arranged in a mechanically decoupled manner within the apparatus for vibration welding. Based on this mechanically decoupled arrangement of the oscillating heads 10, the geometry of the plastic parts to be welded does not need to be adjusted for the arrangement of the oscillating heads 10 or aligned with it. Rather, the oscillating heads 10 can be freely positioned so that an arrangement of the oscillating heads 10 adjusted for any geometry of the plastic parts to be processed is possible.

Each of the oscillating heads 10 is connected with a frequency converter or another suitable drive (not shown). The frequency converters in turn are connected with each other via an electrical circuit such that one of the frequency converters is operated as the master frequency converter (hereinafter master) and the other frequency converters can be operated as slave frequency converters (hereinafter slave). This electrical circuit requires that one of the frequency converters is first defined as the master and the remaining frequency converters are defined as slaves. The master specifies the control and/or supply signals for all frequency converters of the oscillating heads 10, i.e. both for itself and for the slaves. Based on this, any of the frequency converters installed in the vibration welding machine with oscillating head 10 can be defined as master so that a separate frequency converter or a separate control unit for the oscillating systems of the vibration welding machine is not required. It is however conceivable that a further embodiment uses a frequency converter separated by an oscillating head 10 or a separate control unit as master. It is furthermore preferred that not all control signals are specified by the master. Thus, for example, in accordance with a further embodiment, the target amplitudes are not specified by the master, but rather by the individual slaves.

The electrical circuit, via which the frequency converters or the master and slaves are connected, can be designed differently in accordance with different embodiments. In accordance with a first embodiment, the master and the slaves are interconnected via a parallel circuit. Based on this, the master drives all slaves and thus the connected oscillating heads 10 with the same signal as well. All oscillating heads 10 are thereby operated with synchronous frequency and phase. Additionally, each of the slaves is individually connected with the master, in order to receive an individual target value for the amplitude of the oscillation of the individual oscillating head. In this manner, an amplitude controlled in a targeted manner by the master and regulated by the slaves is created in the individual oscillating heads 10. In general, it is of course possible to allow the amplitude to be determined by the master. However, the regulation of the individual amplitudes is preferably taken over by the individual slaves.

In accordance with a further embodiment of the present invention, the slaves are connected with the master via a BUS (Binary Unit System) system. This BUS system ensures the exchange of operating data between the frequency converters so that the connected oscillating heads 10 are fully controlled via the master and BUS system. The operating data transmitted by the master comprises control and/or supply data for the connected slaves, which determine the frequency, amplitude and phasing of the oscillating heads 10.

With the help of the above electrical circuits for connecting the frequency converter and oscillating heads 10, the oscillating heads 10 are operated synchronously (see FIG. 2) in frequency, phase and amplitude or in a selection of these variables or in a targeted asynchronous manner. In this context, synchronous means that the oscillating heads work with the same amplitude, frequency and phasing or with a selection of these matching variables. Asynchronous means that the amplitude and phasing of the different oscillating heads are different with respect to each other. The extent of the differences is determined through the requirements of the vibration welding process. Thus, it is e.g. conceivable that interfering oscillations/vibrations can form in a large-area work piece through synchronous operation of the oscillating heads. These would be balanced out or reduced by the targeted asynchronous drive and operation of one or more oscillating heads. Work-piece geometry, size, properties of the material to be processed and other basic conditions of the vibration welding can thus require this operating mode. For a synchronous frequency control, the respective resonance frequency of the oscillating heads 10 is determined via the associated frequency converter or slave and forwarded to the master. The master calculates the mean value from the identified resonance frequencies so that a frequency target value is forwarded from the master to the slaves or specified to them based on this mean value. The amplitude of the oscillating heads 10 is controlled individually via a target value that can be adjusted in a targeted manner by the master and that is either determined via its own line or via the BUS system to the respective slave to the connected oscillating head 10. The amplitude of the individual oscillating heads can thus be the same in accordance with the respective target value or they can be different.

With the help of the mechanically decoupled arrangement of the oscillating heads 10 and its simultaneous e.g. synchronous drive, the oscillating heads 10 can be freely positioned in the space. Based on this, the spatial arrangement of the oscillating heads 10 with the associated frequency converters or slaves is optimally adjusted for the geometry of the work pieces to be processed. Thus, on one hand, a synchronous or targeted asynchronous driving of the oscillating heads can be ensured, while, on the other hand, the constraints of a mechanical coupling of the oscillating heads are avoided. Two or more oscillating heads 10 are preferably used, while this number can vary with the work-piece geometry and size. It is also preferred to start and to stop the oscillating heads jointly or to perform a chronologically offset stop of the oscillating heads after a joint start.

It is also preferred that the frequency, the phase and the amplitude or just a selection of these variables is controlled synchronously by the master. These differences in control are e.g. specified by the work-piece geometry, size or the properties of the material to be processed. From this, it follows that the control effort to be realized by the master can be modified for the respective work process so that e.g. master overloads are prevented.

We claim:

1. Vibration welding apparatus wherein during a welding procedure, a work piece to be welded is rubbed against another part at contact surfaces in a joint zone, so that heat generated by friction fuses the contact surfaces in the joint zone, and after stopping the welding movement, the work piece is connected to the other part in the joint zone, the apparatus has the following characteristics:
   a. a plurality of mechanically decoupled oscillating heads, each of which are connected with a frequency converter or another suitable drive,
   b. an electrical circuit, which connects the frequency converters of the oscillating heads together such that one of the frequency converters can be operated as the master and the other frequency converter as the slave, so that,
   c. based on the controlling effect of the master, a synchronous or a targeted asynchronous operation of the plurality of oscillating heads can be realized at the same time.

2. Vibration welding apparatus in accordance with claim 1, in which the oscillating heads can be operated synchronously or in a targeted asynchronous manner in frequency, phase and amplitude or in a selection of these variables.

3. Vibration welding apparatus in accordance with claim 1, in which the frequency and phasing of the oscillating heads can be specified by the master, while the frequency is determined by the mean value of the resonance frequency of the oscillating heads.

4. Vibration welding apparatus in accordance with claim 1, in which the slaves can be controlled by the master via a bus system or a parallel circuit with individual amplitude control.

5. Vibration welding apparatus in accordance with claim 1, which has at least two oscillating heads with frequency converters, which can be freely positioned with respect to a work piece.

6. Vibration welding method for the vibration welding of a work piece with a plurality of oscillating heads which are connected with a frequency converter and mechanically decoupled from each other, wherein during a welding procedure, a work piece to be welded is rubbed against another part at contact surfaces in a joint zone, so that heat generated by friction fuses the contact surfaces in the joint zone, and after stopping the welding movement, the work piece is connected to the other part in the joint zone, wherein the method includes the following steps:
   a. defining of at least one of the frequency converters as the master and the remaining frequency converters as slaves, and
   b. driving of the slaves through the at least one master such that
   c. the plurality of oscillating heads is operated at the same time synchronously or in a targeted asynchronous manner in frequency, phase and amplitude or in a selection of these variables.

7. Vibration welding method in accordance with claim 6, in which the driving takes place via a parallel circuit of the frequency converter or through a connection of the frequency converter via a BUS system.

8. Vibration welding method in accordance with claim 6, in which at least two oscillating heads are operated, which can be freely positioned with respect to a work piece.

9. Vibration welding method in accordance with claim 6, which has the further step:
   Specification of the frequency and phasing of the oscillating heads by the master, while the frequency is determined by the mean value of the resonance frequencies of the oscillating heads.

10. Vibration welding method in accordance with claim 6, which includes the further step:
   Specification of an individual or a joint amplitude target value for the oscillating heads by the master and transfer of this target value to the slaves, so that the oscillating heads can be operated with matching amplitudes or with different amplitudes.

* * * * *